Oct. 11, 1932.  W. O. DAILEY  1,882,243
APPARATUS FOR FORMING AND BENDING FLEXIBLE MATERIALS
Filed April 16, 1932   5 Sheets-Sheet 3

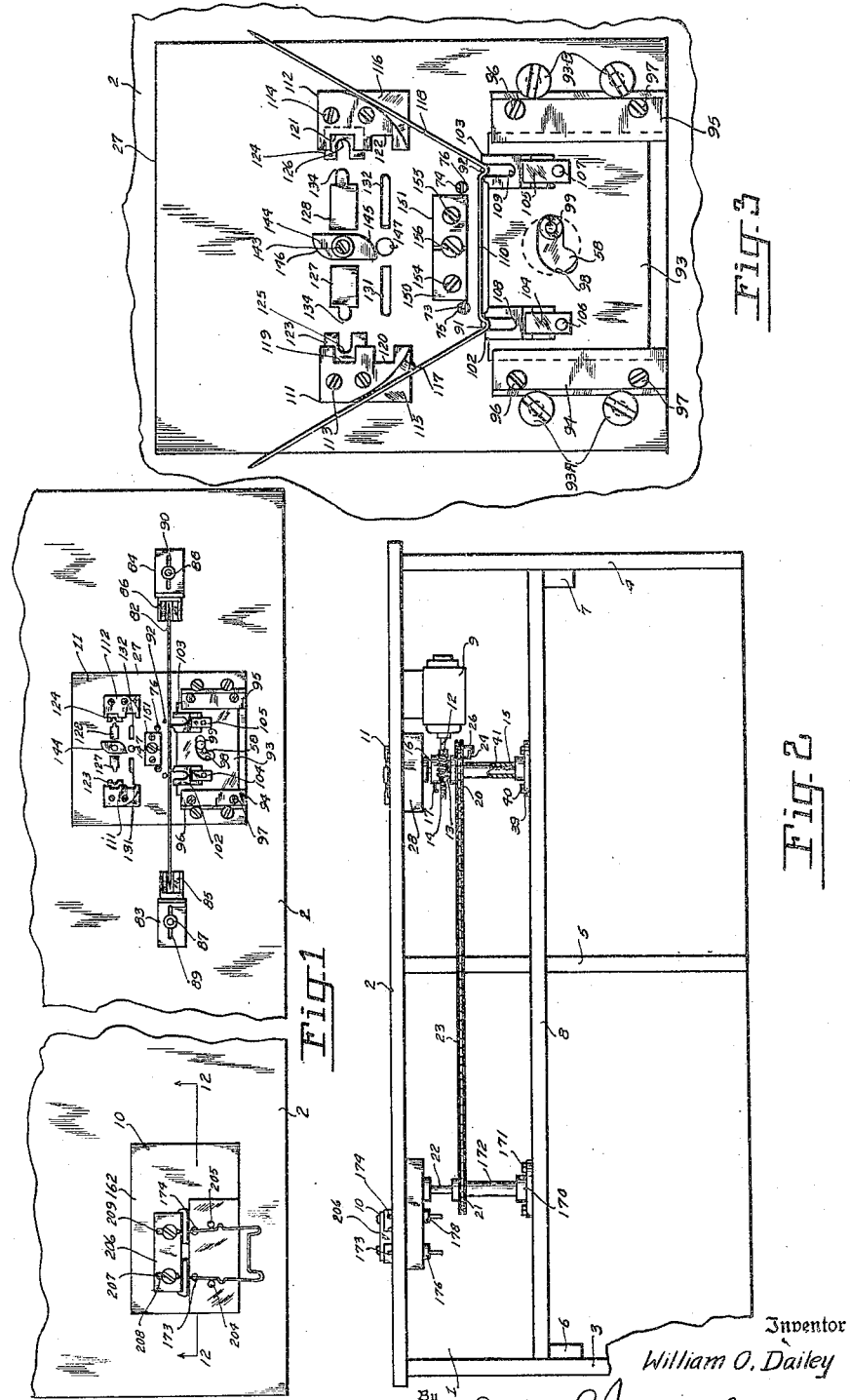

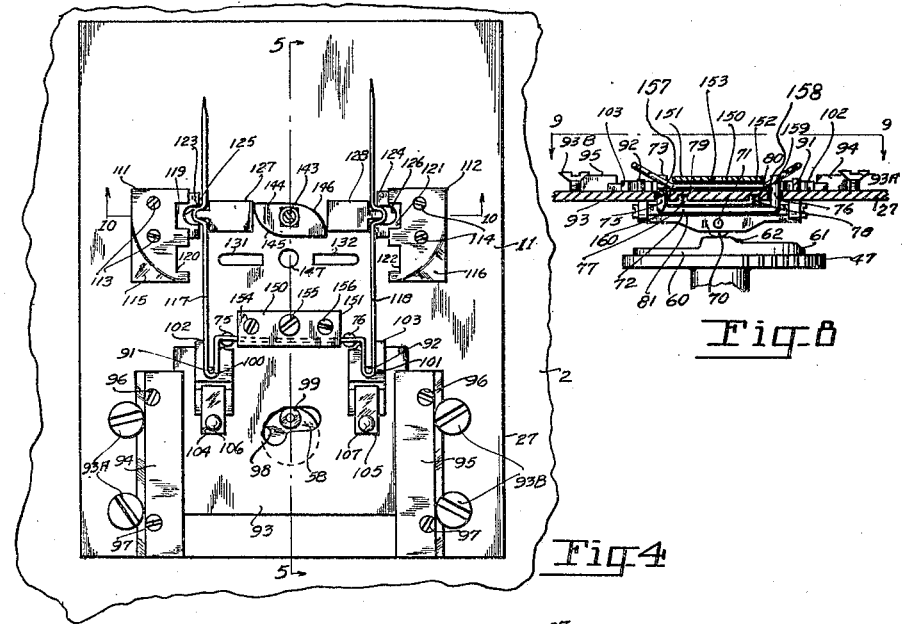
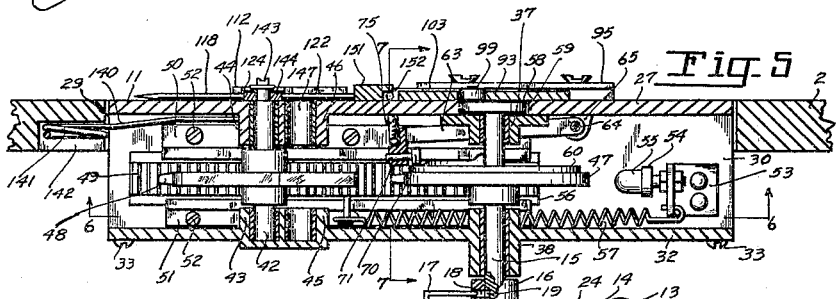
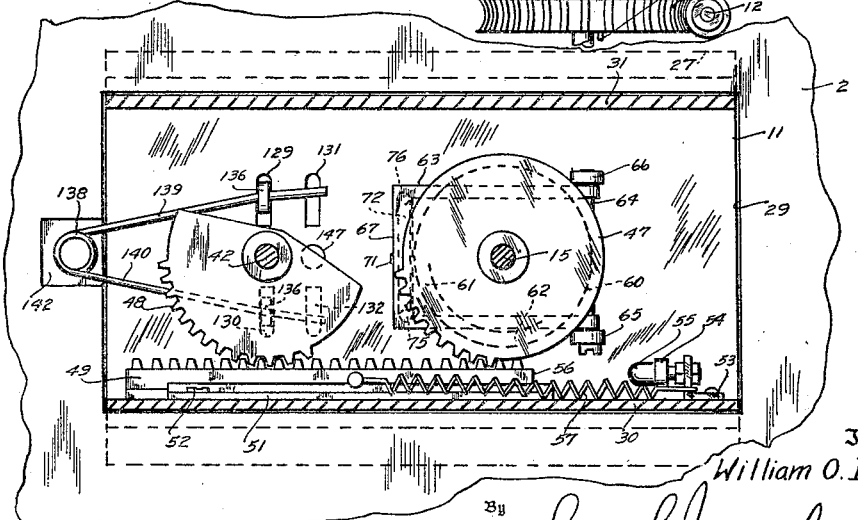

Inventor
William O. Dailey
By Sam S. Jacobson
Attorney

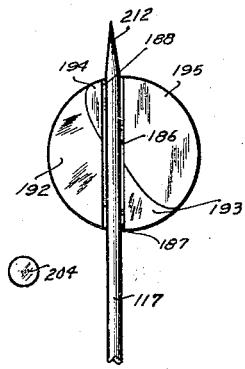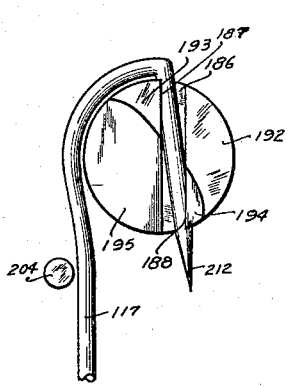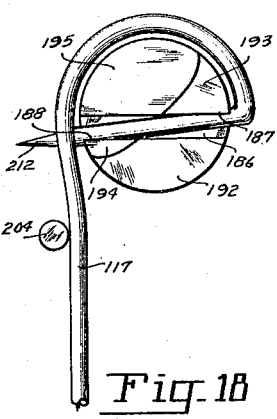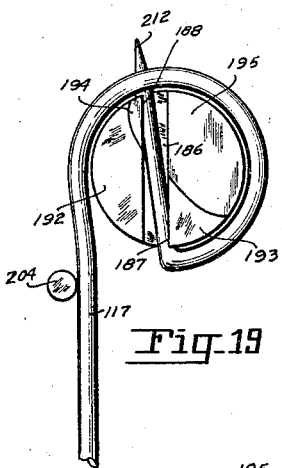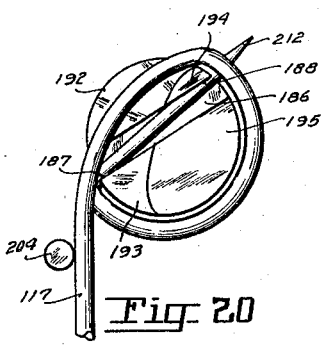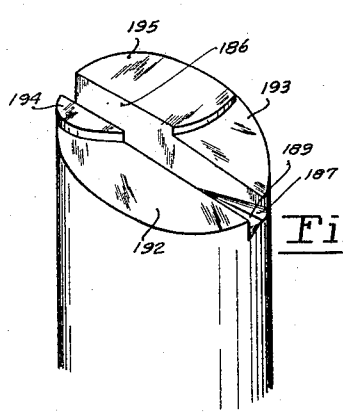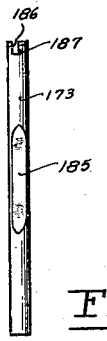

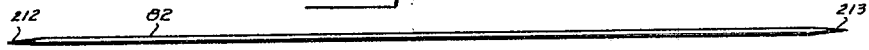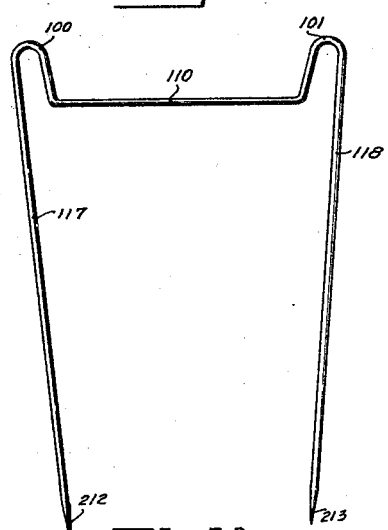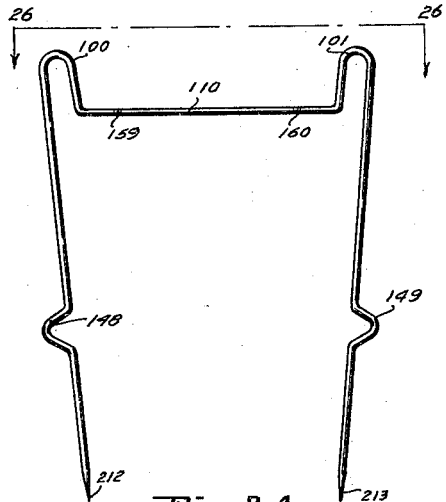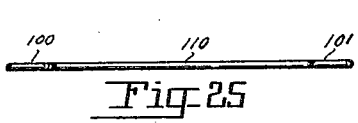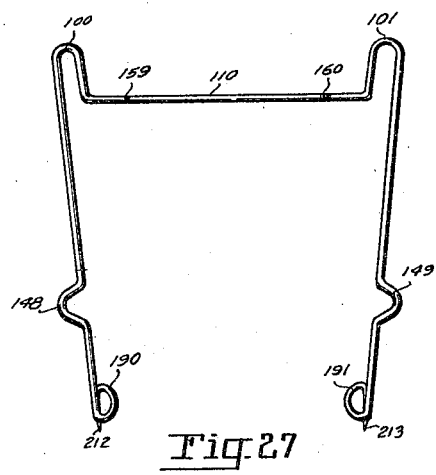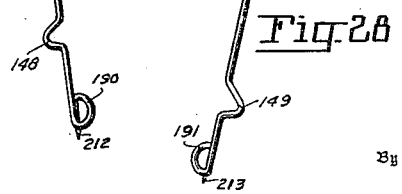

Patented Oct. 11, 1932

1,882,243

UNITED STATES PATENT OFFICE

WILLIAM O. DAILEY, OF PORTLAND, OREGON

APPARATUS FOR FORMING AND BENDING FLEXIBLE MATERIALS

Application filed April 16, 1932. Serial No. 605,768.

This application is a continuation in part of my United States application for a "device for making collar snubbers" filed December 15, 1930, Serial Number 502,462 which was allowed on September 22, 1931 and renewed on April 6, 1932, and the invention relates to apparatus for forming and bending flexible materials to a predetermined shape in order to create a certain article of manufacture adapted for use in connection with soft collars, whereby the same may be supported upon the neck of the wearer in distended position, the soft, pliable corners, points, or wings of the collar being held in the desired flat and tailored condition and the inner or neck band being supported in an up-standing position and thereby maintain the collar in full height; and the invention relates more particularly to apparatus for forming a certain improvement in "spring wire collar snubbers" invented by me, for which an application for Letters Patent of the United States was filed by me on May 31, 1929, Serial Number 367,507 which is still pending and further relates to a certain improvement in a "method of making collar snubbers" invented by me for which an application for Letters Patent of the United States was filed by me June 29, 1931, Serial Number 547,648 which is still pending.

The invention contemplates the use of mechanism whereby a single length or strand of flexible material will be successively operated upon and engaged by instrumentalities which impart the necessary bends and loops and which produce the resiliency required in the completed article of manufacture.

In order to clarify the subsequent description of the invention, in view of its particular relation to the subject matter contained in the United States applications hereinabove identified, and to avoid any possibility for misinterpretation, the following definition of "collar snubber" is here inserted. Unless otherwise specifically limited, the term "collar snubber" is herein employed generically to include all articles or devices made from flexible materials and used for maintaining the shape of the outer fold of soft collars in a flat and tailored condition and for maintaining the knot of the necktie snugly with the upward folds of the collar while allowing the wearer entire freedom of movement, and includes such articles and devices as soft collar supports, adjusters, attachments, stays, stiffeners, and/or retainers.

The particular object of my invention is to provide mechanism whereby "collar snubbers" may be rapidly and effectually produced by the application of certain novel features in the mechanism employed and in the novel shape and form of the article produced by said mechanism.

The mechanism which is herein employed and disclosed is adapted to produce a flexible, light, simple, inexpensive, and durable "collar snubber" which prevents the points, wings, or corners of a soft collar from rolling upwardly or spreading excessively apart and which is sufficiently resilient to bend or give when pressure is applied upon the upper portion of the collar and to return to its normal position when the pressure is released; and which can be concealed from view beneath the collar and yet be readily applied to or removed from its attachment under the collar.

Another object of my invention is to provide semi-automatic apparatus for the manufacture of "collar snubbers" from flexible materials.

A further object of my invention is to provide means in bending and forming flexible material into "collar snubbers" of uniform shape and design in large quantities.

Still other objects of my invention are to simplify the forming and bending flexible materials; to reduce the time and cost required to produce "collar snubbers"; to afford a comparatively simple semi-automatic mechanical way of obtaining "collar snubbers" of uniform design and quality even when operated by inexperienced labor; and generally to improve the art to which this invention relates.

Other objects and advantages and the nature and characteristic features of my present invention will become apparent and readily understood from the following description which is to be considered in conjunction with the accompanying drawings forming a part hereof, in which:

Figure 1 is a top, plan view of the apparatus illustrating the position of a single length or strand of wire within the holding elements of one of the assemblies prior to the operation of the mechanism and further illustrating the position of the partly finished product in the other of the assemblies prior to the operation of the mechanism.

Figure 2 is a front view of the supporting frame illustrating the position of the driving mechanism for both assemblies.

Figure 3 is a fragmentary, top, plan view of the apparatus illustrating the position of the strand of wire during the first stages in the operation of the mechanism and showing the strand of wire removed from the holding elements and being engaged by some of the bending instrumentalities.

Figure 4 is a fragmentary, top, plan view of the apparatus illustrating the position of the strand of wire during subsequent stages in the operation of the mechanism and showing the strand of wire in the act of receiving crimps or loops by some of the other instrumentalities.

Figure 5 is a sectional, side view of the mechanism shown in Figure 4, taken on line 5—5 of said figure looking in the direction indicated.

Figure 6 is an inverted, sectional, plan view of the mechanism shown in Figure 5, taken on line 6—6 of said figure looking in the direction illustrated.

Figure 8 is a fragmentary, sectional, front view of the mechanism illustrating the position of the strand of wire during one of the later stages in the operation of the mechanism and showing the strand of wire receiving offsets by some of the instrumentalities.

Figure 14 is a side view of one of the elements used in forming loops in the strand of wire illustrating the position of the groove and showing the flat gear locking surface.

Figure 15 is a fragmentary, perspective, plan view of one of the elements used in forming loops in the strand of wire illustrating the position of the groove and camming surfaces within the element.

Figure 16 is a diagrammatical layout of one of the elements used in forming loops in the strand of wire and illustrating the position of the strand of wire in the groove prior to the rotation of the element.

Figure 17 is a diagrammatical layout of the element shown in Figure 16 illustrating the shape of the strand of wire after a half turn of the element.

Figure 18 is a diagrammatical layout of the element shown in Figures 16 and 17 illustrating the shape of the strand of wire after a three-quarter turn of the element.

Figure 19 is a diagrammatical layout of the element shown in Figures 16, 17 and 18 illustrating the shape of the strand of wire after a full turn of the element.

Figure 20 is a diagrammatical layout of the element shown in Figures 16, 17, 18 and 19 illustrating the shape of the strand of wire after giving the element more than a full turn for the purpose of compensating for the resiliency of the strand of wire.

Figure 21 is a front view of a single length or strand of flexible material as it appears when taken from stock.

Figure 22 is a front view of the flexible strand of material shown in Figure 21 after the same has had its ends pointed and as it appears when placed into the holding elements illustrated in Figure 1.

Figure 23 is a front elevational view of the strand of wire as it appears after the completion of the first stages in the operation of the mechanism illustrated in Figure 3.

Figure 24 is a front elevational view of the strand of wire as it appears after crimps or loops have been formed therein by the mechanism illustrated in Figure 4.

Figure 25 is an end view of the strand of wire shown in Figure 23.

Figure 26 is an end view of the strand of wire shown in Figure 24, taken on line 26—26 of said figure looking in the direction indicated and illustrating its appearance after the offsets have been formed therein by the mechanism illustrated in Figures 8 and 9.

Figure 27 is a front elevational view of the strand of wire as it appears after the loops have been formed therein by the mechanism illustrated in Figures 12 to 20 inclusive.

Figure 28 is a perspective front view of the strand of wire as it appears in its finished condition as a "collar snubber."

Similar numerals refer to identical parts throughout the several views.

Figure 7:
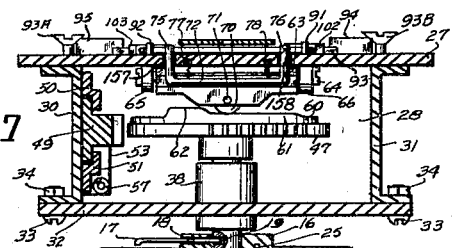
Figure 7 is a sectional, end view of the mechanism shown in Figure 5, taken on line 7—7 of said figure looking in the direction indicated.
Figure 9:
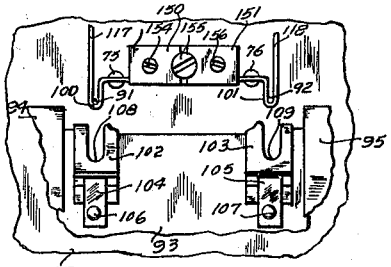
Figure 9 is a fragmentary, top, plan view of the mechanism shown in Figure 8, taken on line 9—9 of said figure looking in the direction indicated and illustrating the position of the strand of wire under a holding element while receiving the offsets illustrated in Figure 8.
Figure 10:
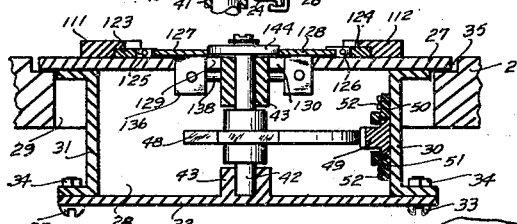
Figure 10 is a fragmentary, sectional, front view of some of the mechanism shown in Figure 4, taken on line 10—10 of said figure looking in the direction indicated and illustrating the instrumentalities for placing the crimps or loops into the strand of wire.

In carrying out my invention disclosed in the drawings, I employ a main-frame 1 which may be constructed from any desirable material and in any convenient dimensions. The frame forms a fixed substantial support for the assemblies comprising the forming and bending mechanisms embodied in my invention. The main-frame has a top 2 and sides 3 and 4 with a bracing element 5 disposed therebetween. Cross-members 6 and 7 are secured to sides 3 and 4 and a shelf 8 is fixedly disposed thereupon. Any type of prime-mover, as an electric-motor 9, may be secured to the frame 1. While such a prime-mover is shown secured to the underside of the top 2, it is apparent that the same could readily be placed upon shelf 8 with equal facility. The electric-motor 9 is suitable for driving the assemblies which comprise the forming and bending mechanisms and which are shown at 10 and 11. The showing of one motor for driving both of these assemblies is not to be taken as a limitation as it would require very slight modification in arrangement in order to provide an independent prime-mover for each assembly.

Armature-shaft 12 of the prime-mover has a worm 13 secured thereto which coacts and meshes with worm-wheel 14. In order to permit each of the assemblies to be operated independently of each other or together, if desired, there is provided the selective mechanism shown in Figures 2, 5 and 7 of the drawings, but this mechanism is merely illustrative of the ends desired to be accomplished and is not to be considered in any other light since it is obvious that a more elaborate clutch mechanism could be applied to accomplish the same results.

The worm-wheel 14 is rotatably disposed about the main-shaft 15 of assembly 11. The worm-wheel has a collar 16 extending upwardly therefrom which has a pin 17 slidably disposed within opening 18. This pin 17 is in registerable alignment with an opening 19 that is disposed within the main-shaft 15. By this means the worm-wheel 14 can be keyed to the main-shaft 15 when desired.

A sprocket-wheel 20 is also rotatably disposed about the main-shaft 15 of assembly 11 and a similar sprocket-wheel 21 is securely keyed to the main-shaft 22 of the assembly 10. An endless sprocket-chain 23 is disposed about each of the sprocket-wheels and is adapted for transmitting rotation from sprocket-wheel 20 to sprocket-wheel 21. A pin 24 is slidably disposed through sprocket-wheel 20 and is in registerable alignment with opening 25 disposed within worm-wheel 14. By this means the sprocket-wheel 20 can be keyed to the worm-wheel 14 when desired. Safety catch 26 is secured to the under side of sprocket-wheel 20 and is adapted to hold pin 24 securely within opening 25 when desired.

From the above description it will be seen that either of the assemblies can be operated independently of the other, or they can both be operated at the same time, or neither of them need be operated, but the prime-mover be used for any other purpose. In order to operate both assemblies simultaneously, pin 17 is pushed inwardly into opening 19 disposed in the main-shaft 15 thereby keying the worm-wheel 14 to the main-shaft 15, and pin 24 is pushed upwardly into opening 25 disposed within worm-wheel 14 and thereby the sprocket-wheel 20 is keyed to the worm-wheel 14. It will be seen that by driving the worm-wheel 14 sprocket-wheel 20 will be rotated and this rotation will be transmitted to sprocket-wheel 21 by sprocket-chain 23. In order to operate assembly 11 only, pin 24 is removed from the opening 25 thus disengaging the sprocket-wheel 20 from the worm-wheel 14 and pin 17 remains within opening 19 and thereby permitting the operation of assembly 11 while assembly 10 remains dormant. In order to operate assembly 10 only, pin 17 is removed from opening 19 disposed in the main-shaft 15 thus disengaging the worm-wheel 14 from the main-shaft 15 and pin 24 remains within opening 25 disposed within worm-wheel 14 and thereby permitting the operation of assembly 10 while assembly 11 remains dormant.

Assembly 11 is secured to the top 2 of the main-frame 1 in any manner. It is necessary, however, that the bed-plate 27 of the assembly-housing 28 be flush with the top of the frame. To accomplish this an opening 29 is cut through the top 2 into which the housing 28 fits snugly. The housing 28 may be made in any suitable manner, but for the purpose of facilitating access to the mechanism disposed within the housing, I provide U-shaped members 30 and 31 which are removably secured to the underside of the bed-plate 27. Base-plate 32 is removably secured to the free portions of the U-shaped members by any suitable means, as by bolts 33 and nuts 34. A ledge-seat 35 is disposed within the top 2 about the periphery of the opening 29 and the ends of the bed-plate rest upon the ledge thereby maintaining a smooth even surface with the top.

The description to follow relates particularly to the mechanism involved in assembly 11 and for such description reference is made to Figures 2 to 11 inclusive. Main-shaft 15 is vertically journaled within housing 28 in hub 37 secured to the underside of the bed-plate 27 and passes through journal 38 disposed within base-plate 32. The shaft extends downwardly and has its oppositely disposed end journaled within journal 39 that is secured to shelf 8 by any suitable means, as by bolts 40. A sleeve 41 is disposed about the shaft 15 and is adapted to hold the sprocket-wheel 20 in proper working relation with the worm-wheel 14. Shaft 15 is the main-driving-shaft for the mechanisms comprising assemblies 10 and 11. A secondary-shaft 42 is also vertically journaled within housing 28 and extends slightly through bed-plate 27. This secondary shaft may be journaled within hub 43 disposed within base-plate 32, journal 44 disposed within bed-plate 27, or within hub 45 disposed within base-plate 32 and journal 46 disposed within bed-plate 27. This arrangement is for a purpose as will later appear.

A gear-wheel 47, having teeth extending only partly around its periphery, is secured upon main-shaft 15 and a gear-segment 48, having teeth extending only partly around its periphery, is disposed about secondary-shaft 42. A gear-rack 49 is slidably disposed within guideways 50 and 51 which are secured to U-shaped-member 30 by any suitable means, as by threaded-screws 52. A bracket 53 is also secured to the U-shaped-member 30 and is directly aligned with and spaced apart from the rack 49. A block 54, having an annular groove therein, is adjustably secured to the bracket 53 and a cushioning-element 55 is removably secured within the groove in such a manner that it acts as a cushion to the end 56 of the rack 49 with which it is directly aligned and which also has the effect of dissipating the jar resulting from the return of the rack to its normal dormant position. The return of the rack to its normal dormant position may be accomplished by any suitable means, as by a reacting-element 57, which is secured to the rack 49 and to the bracket 53 in any satisfactory manner. Gear-wheel 47 is in registerable alignment with the rack 49 and is adapted to coact with and drive the rack, and gear-segment 48 is also in registerable alignment with the rack 49 but has its teeth in mesh at all times with the rack. It will be noted that when the gear-wheel 47 disengages its teeth from the rack, the rack is pulled toward the cushioned-block 54 by reacting-element 57 and consequently the gear-segment 48, since it is at all times in mesh with the rack, is rotated in the direction in which the rack is pulled. The disengaging of the teeth of the gear-wheel 47 from the teeth in the rack 49 forces the rack backwardly because of the pull by the reacting-element 57 thereby forcing the end 56 of the rack to contact the cushioning-element 55 which dissipates the shock and brings the rack to its normal position of dormancy until gear-wheel 47 again meshes its teeth with the teeth in the gear-rack and thereby slides the gear-rack forwardly. By this arrangement, intermittent rotation is transmitted from gear-wheel 47 to gear-segment 48 in timed relation with the rotation of the gear-wheel 47.

Flange 58 is secured to the upper portion of the main-shaft 15 and rides within an opening 59 disposed through the bed-plate 27. The function of this flange will be presently specifically mentioned.

A trackway 60, having cams 61 and 62 disposed upon its upper surface, is disposed upon the gear-wheel 47. Yoke 63 is hingedly journaled upon a shaft 64 that is journaled within bearings 65 and 66 which are secured to the underside of the bed-plate 27. A cross-bar 67, L-shaped in cross-section, is an integral part of the yoke 63. A roller 70 is journaled upon shaft 71 which is secured to and disposed centrally of the cross-bar 67. The roller extends below the lower surface of the cross-bar and is adapted to ride upon the cammed trackway at all times. A U-shaped die-member 72, which has grooves 73 and 74 disposed within the upper ends of its legs 75 and 76, is removably disposed upon the cross-bar 67. Reacting-elements 77 and 78 are disposed within grooves 79 and 80 disposed within the bed-plate 27. These reacting-elements are in direct alignment with the base 81 of the die-member 72 and are adapted to produce a positive downward push to the yoke assembly in order to insure the disengagement of the die-member 72 from the material being operated upon after each cycle of operation and to insure the continuous travel of the roller upon the cammed trackway.

Each of the cams 61 and 62 has a different function to perform and each function will be explained forthwith. The cammed trackway is so positioned about the gear-wheel 47 that roller 70 contacts cam 61 immediately after the loops 100 and 101 are formed within the legs 117 and 118 of the wire as will be described with greater particularity presently.

For the purpose of forming and bending a strand of flexible material, such as wire 82, it is placed within locators 83 and 84, having therein receiving recesses 85 and 86 respectively, the locators being adjustably positioned upon the top 2 by any suitable means, as by threaded-elements 87 and 88 which pass through slots 89 and 90 that are a part of the locators. The strand of flexible material is placed into the receiving recesses in the locators, before the initial operation of the mechanism. Almost in direct alignment with the locator recesses are die-pins 91 and 92 which extend upwardly from the bed-plate 27 and are spaced apart. A reciprocable-member 93 is slidably disposed upon the bed-plate 27 and is guided in its movements by guideways 94 and 95 and slides freely between them. The guideways are adjustably secured to the bed-plate by any suitable means, as by threaded-screws 96 and 97, the heads of which are preferably flush with the surface of the guideways. The reciprocable-member 93 has a cam-slot 98 disposed therethrough which is placed substantially centrally thereof. A cam-roller 99, which is rotatably secured upon the upper surface and near the periphery of the flange 58, is adapted to ride within the cam-slot 98. The shape of the cam-slot herein shown is essential for proper operation of the whole mechanism in timed relation. The position of cam-roller 99 with respect to cam-slot 98 when the loops 100 and 101 have been formed and the crimps or loops 148 and 149 are in the process of being formed should be noted in Figure 4. As the cam-slot is constructed it is intended to permit the reciprocable-member to remain dormant during the time when the crimps are being created without effecting the normal rotation of the flange 58. By this arrangement reciprocating motion is imparted to the reciprocable-member 93 when the main-shaft 15, to which flange 58 is secured, is rotated. Dies 102 and 103 are removably secured to the reciprocable-member 93 by any suitable means, as by lugs 104 and 105. Lugs 104 and 105 are clamped relative to the dies 102 and 103 by any suitable means, as by threaded-screws 106 and 107. These dies have recesses 108 and 109 disposed therein which are in direct alignment with the die-pins 91 and 92. The reciprocable-member assembly is used primarily for the purpose of bending the strand of flexible material to initially form a substantially U-shape in the material and provide a pair of loops heretofore identified in the transverse-bridge-piece 110 as shown in the fabric unit illustrated in Figure 23. The die-recesses and die-pins are of a size and shape to produce the desired loops in the strand of flexible material. For the purpose of permitting lateral adjustment of the reciprocable-member 93 relative to the die-pins 91 and 92 so that dies 102 and 103 are properly aligned with the die-pins, there is provided a number of set-screws 93A and 93B which contact the sides of the guideways 94 and 95.

Blocks 111 and 112 are removably secured to bed-plate 27 by any suitable means, as by threaded-screws 113 and 114, the heads of which are flush with the surfaces thereof. Inclined surfaces 115 and 116 are disposed upon the blocks 111 and 112 respectively over which the legs 117 and 118 of the strand of flexible material pass during the forming of the loops 100 and 101. The blocks have recesses 119, 120, 121 and 122 respectively in which stationary-dies 123 and 124 are adjustably secured. The purpose of having a number of recesses will be subsequently more clearly related. These stationary-dies 123 and 124 have die-recesses 125 and 126 therein which are in direct alignment with the movable-dies 127 and 128. The movable-dies are adapted to slide within slots 129 and 130 or within slots 131 and 132 depending upon the arrangement desired by the operator.

Figure 11:
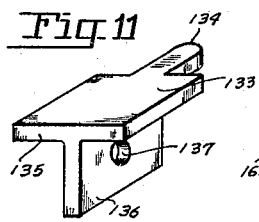
Figure 11 is a perspective view of one of the plungers used in connection with the mechanism illustrated in Figure 10 and whose function is to place the crimps or loops into the strand of wire.
Figure 13:
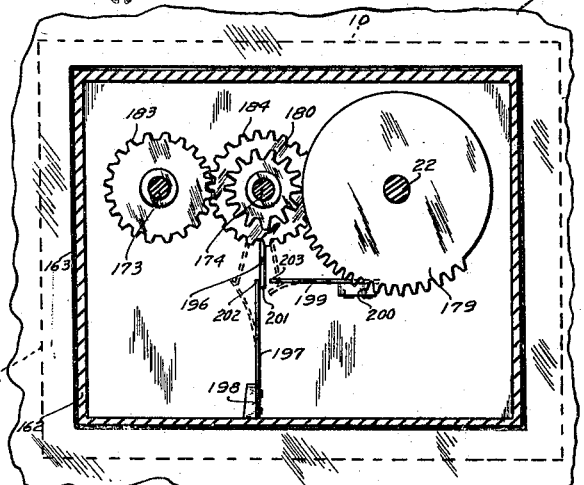
Figure 13 is an inverted, plan view, partially in section, of the mechanism shown in Figure 12.
Figure 12:
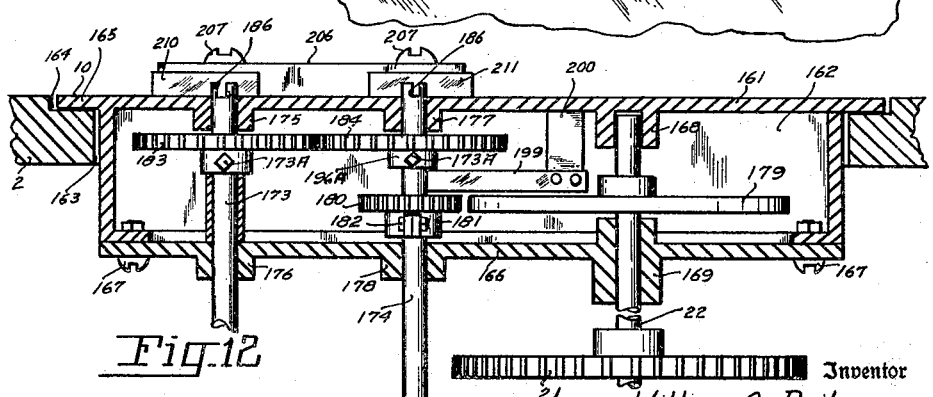
Figure 12 is a fragmentary, sectional, front view of some of the apparatus shown in Figures 1 and 2 illustrating the relation between a portion of the driving gear to the instrumentalities for forming loops in the strand of wire during the final stages in the operation of the mechanism.

The construction of the movable-dies 127 and 128 is shown in Figure 11. Each of these dies has a top 133, a die-tongue 134 extending outwardly from one end of the top and formed to fit into either die-recesses 123 or 124 and cam-surface 135 provided at the other end of the top, a leg 136 extending downwardly from the top and an opening 137 disposed through and near the top of the leg. The leg 136 is adapted to extend through and slide within any of the slots 129, 130, 131 or 132 heretofore described. For the purpose of producing an effective means for removing the die-tongues from the die-recesses and for providing a positive manner of maintaining the movable-dies in slidable working relation with the bed-plate 27, there is provided a suitable reacting element, as a spring 138 which has arms 139 and 140 extending therefrom. Each of these arms 139 is adapted to pass through opening 137 disposed within the movable dies. This reacting element 138 is adapted to have its coil 141 disposed within recess 142 disposed under the top 2. In this manner the underside of the top 133 is held flush with the bed-plate 27 and the movable-dies 127 and 128 are normally maintained in spaced relation to the stationary-dies 123 and 124. Removably secured to the upper end of the secondary-shaft 42 by any suitable means, as by a threaded-screw 143, is the die-engaging-cam 144 which has cam-surfaces 145 and 146 that are adapted to engage the cam-surface 135 of the movable-dies. A shaft-opening 147 that is aligned with slots 131 and 132 is disposed through the bed-plate 27. It is now apparent that elements associated directly or indirectly with shaft 42 may be placed with facility in either one of two positions by merely shifting and manipulating a few elements. This is desirable when the operator wishes to change the position of the crimps or loops 148 and 149 that are created by the manipulation of the heretofore described structure as shown in Figure 24. The die-recesses and die-tongues are of a size and shape to produce the desired crimps or loops in the strand of flexible material. The blocks, stationary-dies and movable dies assemblies are primarily for the purpose of performing the second stage in the manufacturing of a "collar snubber" and is intended, as heretofore explained, to produce crimps or loops in the legs.

The next step in manufacturing "collar snubbers" is accomplished by the apparatus now to be described. Positioning-plates 150 and 151 are disposed upon bed-plate 27 and have furcations 152 and 153 formed at the front thereof into which the transverse-bridge-piece 110 enters when the initial loops 100 and 101 are formed. The positioning-plates are adjustable relative to the bed-plate by manipulating threaded-screws 154, 155 and 156, whose heads are preferably flush with the surface of the positioning-plates. The positioning plates maintain the transverse-bridge-piece 110 in direct alignment with the openings 157 and 158 so that the grooves 73 and 74 disposed within the legs of the U-shaped-die-member 72 may engage the transverse-bridge-piece immediately after the loops 100 and 101 and crimps 148 and 149 are formed and thereby hold the strand of flexible material in fixed alignment while the dies 102 and 103 are removed from about the loops 100 and 101 and from die-pins 91 and 92.

The intermittent projection of the legs of the die-member 72 above the surface of the bed-plate 27 is controlled by the position of the cams 61 and 62 upon which the roller 70 rides during the rotation of the main-shaft assembly.

It will be noted that when gear-wheel 47 upon which trackway 60 is disposed disengages its teeth from the rack 49, the reciprocable member 93 begins its rearward stroke and the cam 144 is releasing the moveable-dies 127 and 128 from the stationary-dies 123 and 124. Cams 61 and 62 are so arranged upon trackway 60 that almost at the same time when the reciprocable member begins its rearward stroke, the roller 70 contacts cam 61 and thereby causing the legs of the die-member to be projected upwardly a sufficient distance to engage and hold the transverse-bridge-piece securely under the furcations 152 and 153. The cam 61 is long enough to permit the clearance of dies 102 and 103 from around the loops 100 and 101 and to permit the complete removal of the moveable-dies 127 and 128 from the stationary-dies 123 and 124. When this occurs, the roller has traveled sufficiently to contact the side of cam 62 and, with some force, the roller is required to ride upon the surface of cam 62. Under these conditions the legs of die-member 72 are projected upwardly a substantial distance causing thereby a pair of bends 159 and 160 within the transverse-bridge-piece 110 as shown in the fabric unit in Figure 26.

Having described the mechanism contained within housing 28 and upon the bed-plate 27, there remains to be described the mechanism comprising assembly 10. For such description reference is made to Figures 2 and 12 to 20 inclusive. Assembly 10 is secured to the top 2 in any manner. It is necessary, however, that the bed-plate 161 of the assembly housing 162 be flush with the top 2 of the frame. To accomplish this an opening 163 is cut through the top 2 in which the housing 162 snugly fits. A ledge-seat 164 is disposed within the top 2 about the periphery of the opening 163 upon which the ledge 165 of the housing is adapted to sit and be flush with the top 2. A base-plate 166 is removably secured to the underside of the housing by any suitable fastening means, as by threaded-screws 167, in order to permit entry within the housing. Main-shaft 22 is vertically journaled within housing 162 in hub 168 secured to the underside of the bed-plate 161 and passes through journal 169 disposed within the base-plate 166. The shaft 22 extends downwardly and has its oppositely disposed end journaled within journal 170 that is secured to shelf 8 by any suitable means, as by bolts 171. A sleeve 172 is disposed about the shaft 22 and is adapted to hold the sprocket-wheel 21 in direct alignment with sprocket-wheel 20. A pair of die-shafts 173 and 174 are also vertically journaled within housing 162 and extend downwardly and upwardly therefrom. Die-shaft 173 is journaled within journals 175 and 176 and die-shaft 174 is journaled within journals 177 and 178. Gear-wheel 179, having teeth extending only partly around its periphery, is disposed about main-shaft 22. A pinion 180 is adjustably secured to the die-shaft 174 and is adapted to coact and mesh with gear-wheel 179. The pinion has a split-hub 181 which is adapted to be tightened about the shaft 174 by manipulation of the threaded-bolt 182 thereby permitting the adjustment of the pinion relative to the gear-wheel 179 and to the die-shaft 174 as well as permitting the adjustment of the shaft itself relative to the bed-plate 161 for a purpose as will appear forthwith. Gear-wheels 183 and 184 are adjustably keyed about the die-shafts 173 and 174 respectively by any suitable means not shown here which coact and are in mesh with each other at all times.

The construction of each of the die-shafts 173 and 174 is shown in Figures 14 and 15. Each of these die-shafts has a flat-surface 185 disposed upon its side against which any holding means, as set-screws 173A, may be placed and in this manner the proper placement of the upper portion of each of the die-shafts relative to the bed-plate 161 is accomplished.

Each of these die-shafts has a main-groove 186 which extends transversely thereof but somewhat off center and secondary-grooves 187 and 188 are disposed at oppositely disposed corners of the main-groove and at the base 189 thereof. The secondary-grooves are intended to cooperate with the main-groove in holding each of the legs of the strand of flexible material in proper alignment while the loops 190 and 191 are being created. Inclined cam-surfaces 192 and 193 are disposed upon the upper surface of each of the die-shafts and offsets 194 and 195 are disposed upon the upper surface of each of the die-shafts. These cam-surfaces and offsets are arranged to cooperatively function with respect to each other and with the legs of the flexible material in order to produce loops 190 and 191.

It is essential that the main grooves 186 be properly aligned prior to the placing of the legs of the strand of flexible material therein and also to be properly aligned after the completion of a cycle of operation of the mechanism. Therefore, a resilient-arm 196 is adjustably secured to the hub 196A by any means not here shown. Another resilient-arm 197 is secured to one side of housing 162 by any suitable means, as by a bracket 198. This second resilient-arm is in direct alignment with the resilient-arm 196 and the free-ends of each of these resilient-arms overlap and normally remain in intimate contact with each other. The resilient-arm 197 is so adjusted relative to the die-shaft as to directly align the main-grooves 186 of the die-shaft 174 with the resilient-arm 197. Since die-shaft 173 is actuated by die-shaft 174 through gear-wheels 183 and 184 it is obvious that the main-groove 186 of die-shaft 173 will also be aligned with the main-groove 186 of die-shaft 174. By this arrangement the grooves are maintained in alignment with each other provided resilient-arm 196 and resilient-arm 197 are normally in contact with each other.

To insure this normal contact between these two resilient-arms, there is provided a third resilient-arm 199 which is secured to the underside of the bed-plate 161 by any suitable means, as by a bracket 200. This third resilient-arm is normally in direct alignment with the free-ends of resilient-arm 196 and 197 and is spaced sufficiently apart from those ends to permit a limited amount of play for arm 196, when the free-end 201 of arm 196 is caught between the free-end 202 of the resilient-arm 197 and the free-end 203 of the resilient-arm 199. There are sufficient teeth in gear-wheel 179 to impart more than one revolution to pinion 180 at each cycle of operation which, in turn, imparts more than one revolution to die-shafts 174 and, by the rotation of the gear-wheels 183 and 184, imparts more than one revolution to die-shaft 173. Before the pinion is rotated, the die-shafts are held in proper alignment by having the end 201 of the resilient-arm 196 disposed within the gap formed between the ends 202 and 203 of the resilient-arms 197 and 199 respectively. After completing slightly more than one revolution of the pinion, as heretofore described, the resilient-arm 196 is again caught within the gap, although resilient-arm 197 is necessarily bent to compensate for the excess rotation of the pinion, and the resilient-arm 199, prior to the completion of the revolution of the pinion, acts somewhat as a brake for the resilient-arm 197. The cooperative action by the resilient-arm 196 in the gap formed between the ends 202 and 203 of resilient-arms 197 and 199 respectively, consequently causes the alignment of the die-shafts.

The upper portions of the die-shafts 173 and 174, that extend upwardly through the bed-plate 161, are spaced from die-pins 204 and 205 in such a manner that the legs 117 and 118 of the strand of flexible material will contact them during the revolving of the die-shafts. A positioning-plate 206 is adjustably secured to the bed-plate 161 by any suitable fastening means, as by threaded-screws 207 which are preferably countersunk and which pass through slots 208 and 209 disposed within the positioning-plate 206. The positioning-plate 206 is adapted to hold hardened-blocks 210 and 211 whose function is to permit the placement of the sharpened-ends 212 and 213 of the legs 117 and 118 thereon before the turning of the die-shafts. There is shown diagrammatically, in Figures 16 to 20 inclusive, various positions assumed by the legs of the strand of flexible material as the die-shafts are rotated. Since each die-shaft operates substantially in the same manner except that they revolve in opposite directions, it is deemed necessary to illustrate only one of these die-shafts in operation. In Figure 16 is shown the position of the leg within the main-groove 186 prior to the rotation of the die-shaft 173. In Figure 17 is shown the position of the leg of the strand of flexible material after a substantially half turn of the die-shaft and showing the position of the leg relative to the secondary-grooves as well as to the main-groove 186. In Figure 18 is shown the position of the leg of the flexible material after a three-quarter turn of the die-shaft, and in Figure 19 is shown the position of the leg of flexible material after a full turn of the die-shaft. Finally, in Figure 20 is shown the position of the leg of flexible material relative to the main-groove, secondary-grooves, and cam-surface 192 after more than one full turn of the die-shaft. The purpose for requiring the rotation of the die-shafts for more than one full turn is to permit compensation for the inherent resiliency in the strand of flexible material being operated upon.

*Modus operandi*

The operation of the apparatus may now be explained. In the following description it is assumed that all the required adjustments in the apparatus have been made in order to produce the article desired, and therefore, no detailed analysis of the various adjustments which can be made for the purposes of manufacturing different sizes of "collar snubbers" or for other purposes will be given.

A strand of flexible material, after being taken from stock and having its ends pointed, is placed within the locator recesses so that it lies upon the bed-plate between the die-pins and the dies that are attached to the reciprocable-member. As the main-shaft is rotated by the source of power heretofore described, the reciprocable-member is moved forwardly so that the dies attached thereto contact the strand of flexible material and bend the same around the die-pins thereby forming the loops and the transverse-bridge-piece as is clearly shown in Figure 3. The forward movement of the reciprocable-member ceases when the transverse-bridge-piece of the strand of flexible material is placed under the furcations of the positioning-plates and the reciprocable-member does not start its rearward movement until after the completion of the second stage in the creation of a "collar snubber".

When the initial loops and transverse-bridge-piece are created, the free portions of the strand of flexible material, by virtue of the tension applied upon the loops and upon the transverse-bridge-piece, automatically take their position between the moveable-dies and stationary-dies and lie upon the bed-plate. When the gear-wheel on the main-shaft meshes with the teeth in the rack and thereby actuates the gear-segment upon which the cam 144 is secured, the moveable-dies will move forwardly in opposite directions and insert their die-tongues into the recesses disposed in the stationary-dies at the same time carrying along the legs of the strand of flexible material into the said recesses. In this manner the crimps or loops in the legs are formed. It should be remembered that the gear-wheel on the main-shaft does not come into mesh with the gear-rack until after the initial loops and transverse-bridge-piece have been created. Immediately after the second stage of manufacturing "collar snubbers" is completed, namely, the creation of the crimps or loops in the legs, the gear-wheel on the main-shaft disengages the teeth in the gear-rack and, by virtue of the spring attached to the rack the rack is returned to its normal dormant position and, in returning, it moves the gear-segment in the same direction, consequently disengaging the cam 144 from the moveable dies and permitting them to return to their normal spaced position relative to the stationary-dies. Simultaneously with the disengagement of the gear-wheel on the main-shaft from the gear-rack the reciprocable-member begins its rearward movement, but, before the transverse-bridge-piece has an opportunity to disengage from the furcations of the positioning-plates, the legs of the die-members 72 are projected upwardly by virtue of the roller 70 contacting cam 61 of the trackway and the grooves in the legs of the die-member engage the transverse-bridge-piece and hold the same securely under the furcations. When the reciprocable-member in its rearward movement disengages the dies contained thereon from the loops and from the die-pins, and when the moveable-dies are disengaged from the stationary-dies and from the crimps or loops, the legs of the die-member 72 are further projected upwardly by virtue of the roller 70 contacting the cam 62 of the trackway, and, as these legs are projected upwardly, the bends 159 and 160 are created in the transverse-bridge-piece. Immediately after these bends are created the legs of the die-member 72 are disengaged from the transverse-bridge-piece by the downward push of a pair of springs reacting against the base of the die-member and against the underside of the bed-plate leaving the strand of flexible material free. This completes the third stage in the manufacture of a "collar snubber".

The strand of flexible material with the various loops, crimps and bends is then transferred to assembly 10 and is there aligned in the grooves of the die-shafts with the pointed ends in intimate contact with the hardened blocks. The strand of flexible material is then ready for the final operation. This is accomplished by the engagement of the teeth of the gear-wheel 179 with the pinion and thereby rotating the die-shaft 174 for more than one full turn. By virtue of gear-wheels 183 and 184 being meshed and identical in structure, a similar amount of rotation is transmitted to shaft 173 but in the opposite direction. The appearance of the strand of material after each operation and in its completed condition as a "collar snubber" is illustrated in Figures 16 to 28 inclusive.

This completes the detailed description of the elements applied in my invention and from the foregoing description it will be seen that I have produced apparatus for forming and bending flexible materials which substantially fulfills the objects of the invention set forth herein.

While this specification sets forth in detail the present and preferred construction of the apparatus adapted for use in the application of my new and improved apparatus for forming and bending flexible materials, still in practice, deviations from such detail as come within the skill of the mechanic may be resorted to but which do not depart from the spirit of the invention herein. It is understood, therefore, that I consider as my own all such modifications and adaptations of the invention as fairly fall within the scope of the invention defined in the appended claims; provided, of course, the means and steps set forth in the following claims are employed.

Having thus described my invention, what I claim as new and useful and upon which I desire to secure Letters Patent is:

1. The combination of a frame, a pair of assemblies disposed therein, one of the assemblies containing means for forming loops within a strand of flexible material, means for forming crimps therein, and means for forming bends therein, and the other of the assemblies containing means for forming loops in the strand of flexible material adjacent its ends.

2. Apparatus as mentioned in claim 1 including means for holding the strand of flexible material relative to the top of the frame prior to the operation of the assemblies.

3. The apparatus as mentioned in claim 1 including means for driving both of the assemblies.

4. Apparatus as mentioned in claim 1 including means for driving the assemblies and selective means for operating either of the assemblies.

5. In apparatus of the class described, mechanism for bending a strand of flexible material into substantially a U-shaped form, means for crimping the legs thus formed, means for bending the base of the material, and means for looping the material adjacent the free-ends of the legs.

6. Apparatus as mentioned in claim 5 wherein the means for bending a strand of flexible material into substantially a U-shaped form includes mechanism for forming loops within the material adjacent the base thereof.

7. Apparatus as mentioned in claim 5 wherein the means for bending a strand of flexible material into a substantially U-shaped form, the means for crimping the legs of the material, the means for bending the base of the material, and the means for looping the material adjacent the ends of the legs, are synchronized to operate in timed relation and in sequence with each other.

8. In means for forming and bending flexible materials, the combination of a frame, a housing disposed thereon, means disposed upon the housing for forming loops within a strand of flexible material, means disposed upon the housing for forming crimps within the material, means disposed within the housing for forming bends within the material, another housing disposed upon the frame, and means disposed upon said housing for forming loops adjacent the ends of the material.

9. Means as mentioned in claim 8, including means for imparting reciprocating motion to the means for forming the crimps in the material in timed relation with the means for forming the loops within the material.

10. Means as mentioned in claim 8, including means for imparting reciprocating motion to the means for forming the bends in the material in timed relation with the means for forming the loops and with the means for forming the crimps within the material.

11. Means as mentioned in claim 8, including driving mechanism adapted to actuate the respective means in timed sequence with each other.

12. In apparatus for bending and forming flexible material, the combination of a frame, means for holding a strand of flexible material upon the frame, a housing disposed within the frame immediately below the holding means, means slidably disposed upon the housing for forming loops within the flexible material, means disposed upon the housing for forming crimps within the material, means reciprocably disposed through the housing for forming bends within the material, means for forming loops adjacent the ends of the flexible material, and means for actuating the respective means.

13. Apparatus for forming and bending flexible materials, in combination, a frame, a housing disposed thereon, a driving-shaft disposed through the housing, a driven-shaft disposed within the housing, means for rotating the driving-shaft, means for driving the driven-shaft, slidable means disposed upon the housing, means associated with the driving-shaft and the slidable means for reciprocating the slidable means, positioning means disposed upon the housing in line of travel of the slidable means, reciprocating means disposed at right angles to the line of travel of the slidable means, means intermittently projected through the housing for forming bends within the material, another housing disposed upon the frame, a driving-shaft disposed through the housing, driven-die-shafts disposed within the housing, means for rotating the driving-shaft, means for driving the driven-shafts, and means for returning the driven-die-shafts to their normal alignment at the completion of each cycle of operation.

14. Apparatus as mentioned in claim 13, including means for actuating the reciprocating means in timed relation with the slidable means.

15. Apparatus as mentioned in claim 13, including means for actuating the projected means through the housing in timed relation with the slidable means and the reciprocating means.

16. Apparatus as mentioned in claim 13, including die-pins extending upwardly from the housing and being in the line of travel of the slidable means.

17. Apparatus as mentioned in claim 13 wherein the actuating means for the slidable means, the reciprocating means and the projected means are synchronized to be actuated in timed sequence with each other.

18. Apparatus for forming and bending flexible materials, in combination, a frame, a housing disposed therein, a driving-shaft disposed through the housing, a driven-shaft disposed within the housing, means for rotating the driving-shaft, means for driving the driven-shaft, slidable means disposed upon the housing adapted to form loops within a strand of flexible material, means associated with the driving-shaft and the slidable means for reciprocating the slidable means, reciprocating means disposed at right angles to the line of travel of the slidable means adapted for crimping the material, and means intermittently projected through the housing adapted to bend the material.

19. Apparatus as mentioned in claim 18 including mechanism for imparting reciprocating motion to the reciprocating means.

20. Apparatus as mentioned in claim 18 including mechanism for imparting reciprocating motion to the intermittently projected means in timed relation with the slidable means and the reciprocating means.

21. Apparatus as mentioned in claim 18 including die-pins extending upwardly from the housing and being in the line of travel of the slidable means.

22. Apparatus as mentioned in claim 18 including dies removably secured to the slidable means and being disposed in registerable alignment with the die-pins.

23. Apparatus as mentioned in claim 18 wherein the mechanism for driving the slidable means, the reciprocating means, and the intermittently projected means is synchronized to actuate the respective elements in timed sequence with each other.

24. In apparatus of the character described, in combination, a frame, housings disposed upon the frame, a driving-shaft journaled through one of the housings, a driven-shaft disposed within the same housing, a driven-shaft disposed through the other housing, die-shafts disposed within the other housing, means for driving the driving-shaft, means for driving all of the other shafts, including gear means mounted upon each of the shafts, a gear-rack slidably disposed within the first mentioned housing, means for returning the gear-rack to its normal dormant position at the completion of each cycle of operation, a reciprocable-member disposed upon the first mentioned housing, means for imparting reciprocating motion to said member, movable-dies disposed upon the first mentioned housing, means for imparting reciprocating motion to said movable-dies, stationary-dies secured to the first mentioned housing, a die-member adapted to be intermittently projected through the first mentioned housing, means for intermittently projecting said die-member, and means disposed within the other housing for normally returning the die-shafts to their normal alignment at the completion of each cycle of operation.

25. Apparatus as characterized in claim 24, including a resilient-element for returning the gear-rack to its normal dormant position at the completion of each cycle of operation, and a cushioning device in direct alignment with the end of the gear-rack adapted for dissipating the recurring shock.

26. Apparatus as characterized in claim 24, including a pair of dies removably disposed upon the reciprocable-member.

27. Apparatus as characterized in claim 24, wherein the means for imparting reciprocating motion to the reciprocable-member consists of a flange disposed upon the driving-shaft and a cam-roller secured to the flange at its outer periphery and adapted to ride within the cam-opening disposed within the reciprocable-member.

28. Apparatus as characterized in claim 24, wherein the means for imparting reciprocating motion to the movable-dies consists of a double cam secured to the driven-shaft disposed within the first mentioned housing, and a gear-segment disposed about the same shaft in mesh at all times with the gear-rack.

29. Apparatus as characterized in claim 24, wherein the die-member adapted to be intermittently projected through the first mentioned housing consists of a U-shaped body-element having grooves disposed within the legs thereof.

30. Apparatus as characterized in claim 24, wherein the means for intermittently projecting the die-member consists of a cammed-trackway disposed about the driving-shaft, a yoke hingedly secured within the housing, and having a roller adapted to ride upon the trackway.

31. Apparatus as characterized in claim 24, wherein the means for returning the die-shafts to their normal alignment at the completion of each cycle of operation consists of a resilient-arm secured to one of the die-shafts, and a pair of resilient arms disposed within the housing at right angles to each other and adapted for normally maintaining the first mentioned resilient-arm between their free-ends.

32. In apparatus of the character described, the combination of a frame, means for locating a strand of flexible material upon the frame, a housing disposed within the frame, a reciprocable-member disposed upon the housing, means for reciprocating said member, dies disposed on the front end of said member, die-pins disposed in direct alignment with the openings in said dies, and positioning-means disposed upon the housing in spaced relation with the reciprocable-member, said dies, die-pins, and positioning-means adapted to form loops within a strand of flexible material when the reciprocable-member is moved forwardly.

33. In apparatus of the character described, the combination with a frame, means for positioning a strand of flexible material upon the frame, a housing disposed within the frame, a reciprocable-member disposed upon the frame, means for driving the reciprocable-member, stationary-die-holding-plates disposed in spaced relation with the reciprocable-member, movable-dies in registerable alignment with said plates, and means for reciprocating the movable-dies, said stationary-die-holding-plates and movable-dies adapted to form crimps in the strand of flexible material.

34. In apparatus of the character described, the combination with a frame, means for holding a strand of flexible material upon the frame, a housing disposed within the frame, a reciprocable-member disposed upon the housing, means for imparting reciprocating motion to said member, mechanisms secured to the reciprocable-member and disposed upon the housing for forming loops within the strand of flexible material, stationary-die-holding-plates disposed upon the housing, movable-dies slidably disposed relative to the housing, mechanism for actuating said movable-dies, means projected through the housing for forming bends within the strand of flexible material and mechanism for projecting the last mentioned means through the housing.

35. In apparatus of the class described, the combination with a frame, a housing disposed therein, a main-shaft disposed therethrough, a pair of die-shafts disposed therethrough, one of said die-shafts adapted to be actuated by the main-shaft, the other of the die-shafts adapted to be actuated by the other of the die-shafts, and means for aligning both of the die-shafts with each other at the completion of each cycle of operation, said means including a resilient-arm secured to the die-shaft that is actuated by the main-shaft, and a pair of resilient arms adapted for normally maintaining the first mentioned resilient-arm between their free ends.

36. In apparatus of the class described, the combination with a frame, a housing disposed therein, a main-shaft disposed therethrough and die-shafts disposed therethrough, means disposed upon the main-shaft for driving one of the die-shafts, means disposed upon the die-shaft driven by the main-shaft for driving the other die-shaft, means for returning the die-shafts to their normal alignment at the completion of each cycle of operation, and means disposed upon the housing for positioning the strand of flexible material prior to the rotation of the die-shafts.

37. In apparatus as mentioned in claim 36 wherein each of the die-shafts has a groove disposed within its upper end and cams disposed adjacent thereto.

38. In apparatus of the character described, the combination of a frame, a housing disposed within the frame, a reciprocable-member disposed upon the housing, dies secured to said member, a driving-shaft disposed through the housing, means for driving said shaft, means associated with the shaft and the reciprocable-member for imparting reciprocating motion to said member, die-pins disposed in direct alignment with the openings in the dies, and positioning means disposed upon the housing in spaced relation with the dies and die-pins, said dies, die-pins, and positioning means adapted to form loops within a strand of flexible material when the reciprocable-member is moved forwardly.

39. In apparatus of the character described, the combination with a frame, a housing disposed within the frame, a reciprocable-member disposed upon the frame, means for driving said member, stationary-die-holding-plates disposed in spaced relation with the reciprocable-member, movable-dies in registerable alignment with said plates, a driven-shaft selectively disposed within the housing, means for driving the driven-shaft, and a cam secured to the upper end of the driven-shaft adapted for reciprocating the movable-dies, said plates and movable-dies adapted to form crimps in the strand of flexible material.

40. In apparatus of the character described, the combination with a frame, a housing disposed within the frame, a reciprocable-member disposed upon the housing, means for imparting reciprocating motion to said member, means disposed upon said member and upon the housing for forming loops within the strand of flexible material, means for forming crimps within the strand of flexible material, means projected through the housing to form bends within the strand of flexible material, a yoke hingedly secured within the housing, said yoke adapted to hold the projected means, and means for reciprocating the yoke.

In testimony whereof, I affix my signature.

WILLIAM O. DAILEY.